United States Patent
Alacqua et al.

(10) Patent No.: US 6,669,444 B2
(45) Date of Patent: Dec. 30, 2003

(54) FAN OR PROPELLER, WITH SHAPE MEMORY

(75) Inventors: Stefano Alacqua, Orbassano (IT); Francesco Butera, Orbassano (IT)

(73) Assignee: C.R.F. Societa Consortile per Azioni, Orbassano (IT)

(*) Notice: Subject to any disclaimer, the term of this patent is extended or adjusted under 35 U.S.C. 154(b) by 0 days.

(21) Appl. No.: 10/098,297

(22) Filed: Mar. 18, 2002

(65) Prior Publication Data
US 2002/0131859 A1 Sep. 19, 2002

(30) Foreign Application Priority Data
Mar. 16, 2001 (IT) ...................... TO2001A0249

(51) Int. Cl.⁷ ............................................. F04D 29/38
(52) U.S. Cl. .................. 416/132 A; 416/205; 416/147; 416/230; 416/241 R; 416/135

(58) Field of Search .................. 416/147, 205, 416/135, 132 A, 229 R, 230, 241 R, 244 R, 240, 155

(56) References Cited

U.S. PATENT DOCUMENTS

| | | | | |
|---|---|---|---|---|
| 3,764,227 A | * | 10/1973 | Albertzart | 416/39 |
| 6,015,263 A | * | 1/2000 | Morris | 416/132 A |
| 6,065,934 A | * | 5/2000 | Jacot et al. | 416/155 |

FOREIGN PATENT DOCUMENTS

JP     61205396 A   *   9/1986  .......... F04D/29/36

* cited by examiner

Primary Examiner—Ninh H. Nguyen
(74) Attorney, Agent, or Firm—Sughrue Mion, PLLC

(57) ABSTRACT

A propeller or fan, in particular a cooling fan, such as for the radiator of a motor vehicle or electric equipment, for civil or industrial plants, comprising shape-memory actuator means to regulate the direction and/or shape of the blades, for example according to variations in temperature.

5 Claims, 3 Drawing Sheets

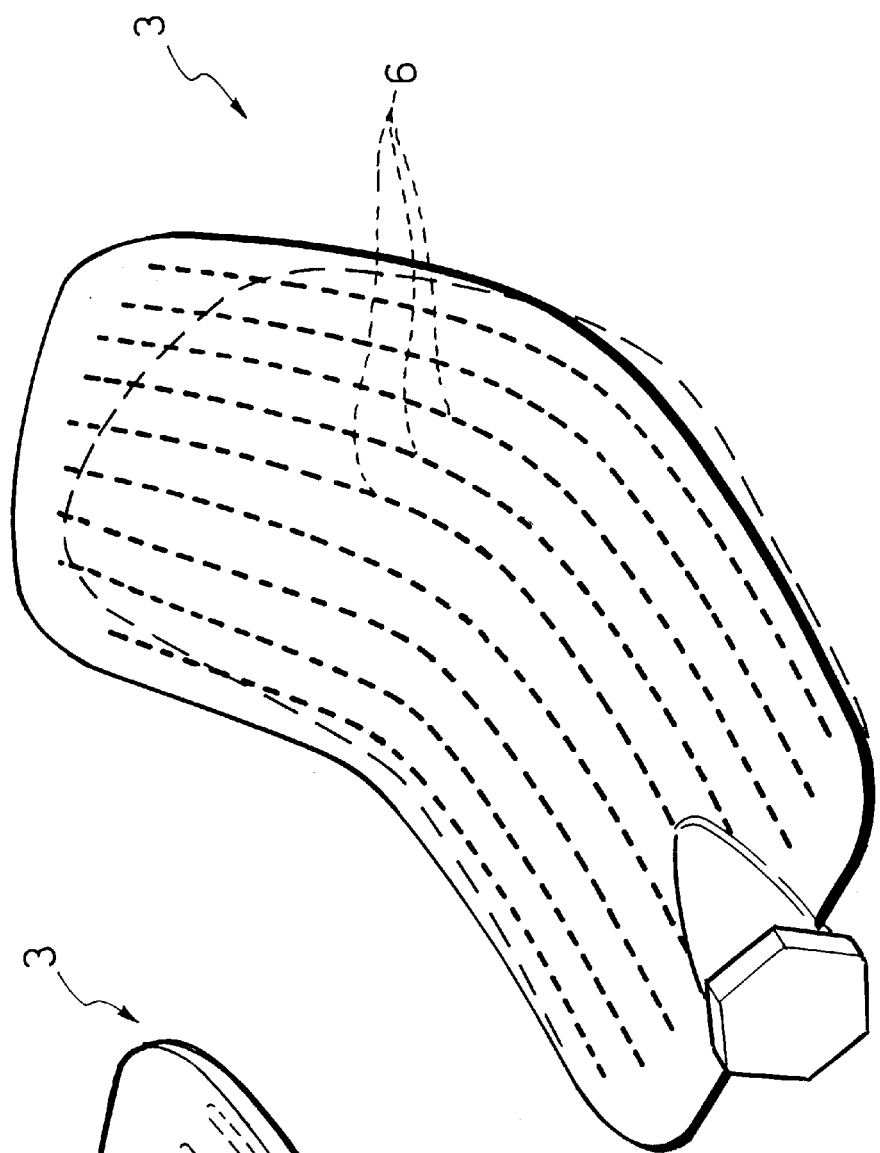
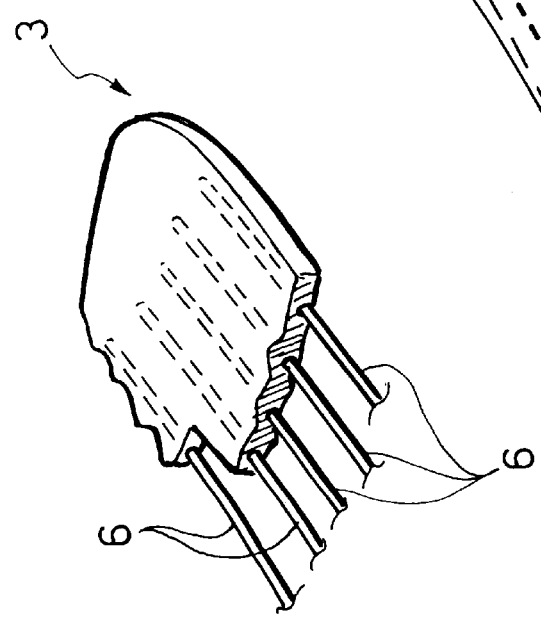

FAN OR PROPELLER, WITH SHAPE MEMORY

BACKGROUND OF THE INVENTION

The present invention relates to the field of propellers in general, including both propulsion propellers and fans, in particular cooling fans, such as the type utilized in association with radiators for motor vehicles or also, in general, cooling fans utilized for example in electric transformers or electric equipment in general, or for example fans to ventilate civil or industrial plants.

In many of the aforesaid applications it is necessary to regulate the flow of air provided by the propeller or fan. In the case of the motor vehicle radiator, for example, regulation of the rotation speed of the fan according to variation in the temperature is already known, by providing an electric actuator, a temperature sensor and an electronic unit to control the actuator on the basis of the feed-back signal generated by the sensor. All known solutions are relatively complicated and also somewhat inefficient, as they require a relatively high expenditure of energy.

SUMMARY OF THE INVENTION

The object of the present invention is to produce a propeller or fan, in particular a cooling fan, that is able to provide a variable outflow of air with extremely simple, functional and efficient means.

With a view to attaining this object, the invention relates to a propeller or fan, in particular a cooling fan of the type indicated hereinbefore, comprising a hub, and a plurality of blades carried by the hub, characterized in that it comprises shape-memory actuator means to regulate the direction and/or shape of the blades. These actuator means may be arranged to act automatically according to variation in temperature, or can be piloted by causing heating of the shape-memory elements provided in them by circulation of an electric current through them.

The use of shape-memory actuators has been known in general for some time. The same Applicant has already proposed several patents in the field such as for the regulation of rear view mirrors of motor vehicles, shutter fins for air-conditioning devices of motor or other vehicles. Shape-memory metal alloys, typically nickel and titanium, have the property of being subjected to contraction when they reach a pre-established transition temperature between −20° C. and +90° C.

Thanks to the characteristics indicated hereinbefore, the application of the invention to a cooling fan regulated according to the temperature is extremely simple and efficient. In fact, when there is a variation in the temperature of the shape-memory actuator means associated with the fan, these means automatically vary the geometry of the fan to obtain the desired effect. In other words, the device according to the invention is in this case self-adapting, as the parameter that causes activation of the shape-memory material, namely the temperature, is the same parameter which requires the fan to be regulated when there is a variation in it.

In a first embodiment, each blade of the fan is connected to the hub by a shaft composed of a shape-memory material, deformable (for example by torsion) through the action of its heating, so that each blade rotates progressively from a condition in which it defines a propeller with a minimum pitch to a condition with maximum pitch as the temperature increases.

Regulation of the flow of air delivered by the fan is thus obtained in a very simple manner, by varying the pitch of the propeller defined by the fan, with a rotation of the blades determined automatically by a variation in temperature, so as to prevent complex regulation devices, such as those utilized in known technique to regulate the speed of the electric motor that operates the fan according to the temperature.

In an alternative embodiment, each blade is composed of a flexible material and incorporates a plurality of shape-memory wires, arranged along the blade, which cause progressive twisting of the blade as the temperature increases.

As the temperature decreases, return of the blade towards its position at rest can be accelerated by elastic return means associated with the blade. Nonetheless, this contrivance is not essential, as return of the blade towards its position at rest is in any case encouraged by the aerodynamic action on the blade.

As can be seen, the shape-memory actuators means arranged according to the invention do not require any electric power supply, which makes the device extremely efficient, as no energy consumption is required. Nonetheless, this does not exclude the possibility of applying the invention to a propeller or fan in which the shape-memory element is heated by feeding an electric current through the element.

BRIEF DESCRIPTION OF THE DRAWINGS

Further characteristics and advantages of the invention shall become apparent in the description hereunder with reference to the accompanying drawings, provided purely as a non-limiting example, in which:

FIG. 5 is a perspective view of an alternative embodiment of a blade of the fan according to the invention, and FIG. 6 is a partially cross-sectioned part perspective view of the blade in FIG. 5.

With reference to FIG. 1, number 1 indicates the cooling fan assembly, in this specific case a cooling fan of a motor vehicle radiator, comprising a hub 2 destined to be drawn in rotation by a motor, and a plurality of blades 3. Each blade 3 is connected to the hub 2 by means of a shaft 4 composed of a shape-memory material, which is torsionally deformed following an increase in temperature over a predetermined transition temperature. One end of the shaft 4 is connected to the root 5 of the blade 3, while the opposite end is connected to the hub 2. Therefore, following an increase in temperature, the end of the shaft 4 connected to the root 5 rotates in relation to the opposite end connected to the hub 2, around the axle 4a of the shaft 4, and therefore the blade 3 rotates around said axle. ++Consequently, the fan passes from a condition in which the blades define a propeller with minimum pitch (FIG. 1) to a condition in which the blades define a propeller with maximum pitch, shown in FIG. 2, with consequent variation in the flow of air supplied by the fan. Regulation of this flow is thus obtained simply and immediately as the temperature varies, without the need for actuators that require an electric power supply or in any case expenditure of energy. In other words, as already indicated, the device is self-adapting.

DETAILED DESCRIPTION OF THE INVENTION

Figure 2:
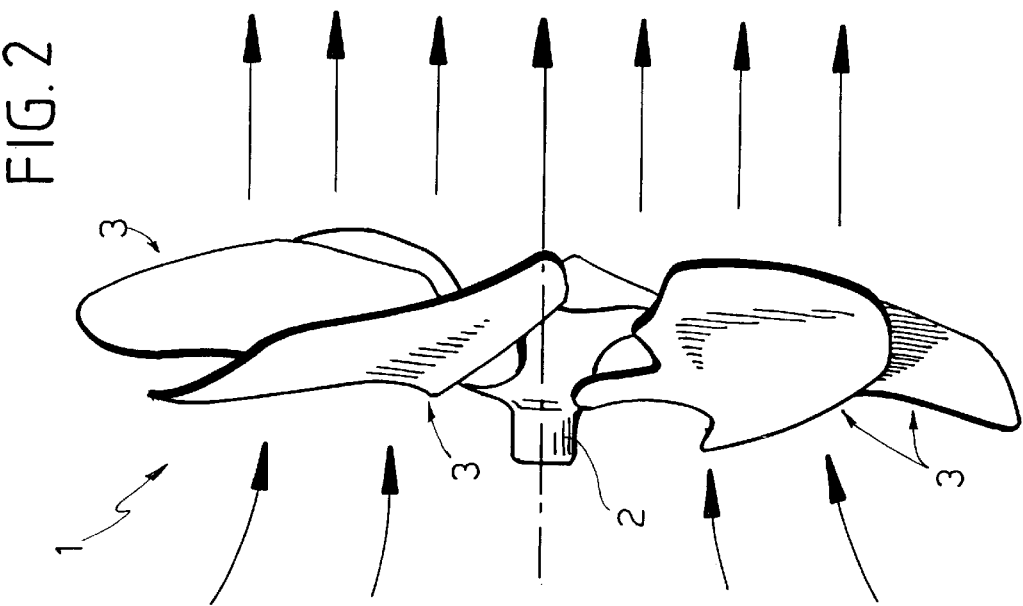
FIGS. 1, 2 show a side view of a fan according to a first embodiment of the invention, in two different operating conditions.
Figure 1:
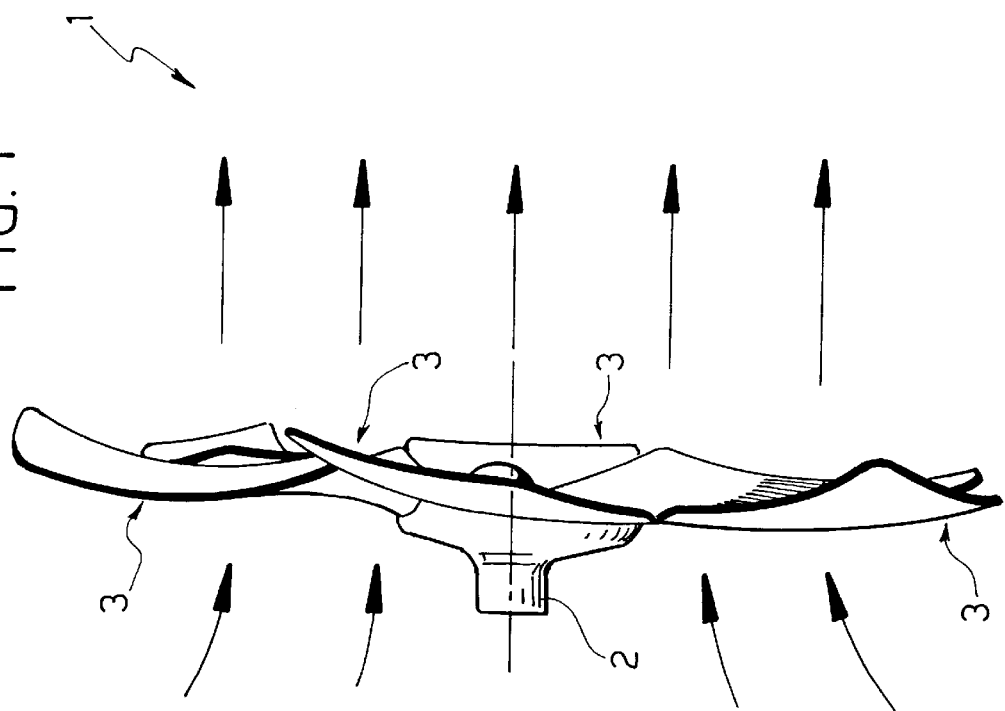
Figure 4:
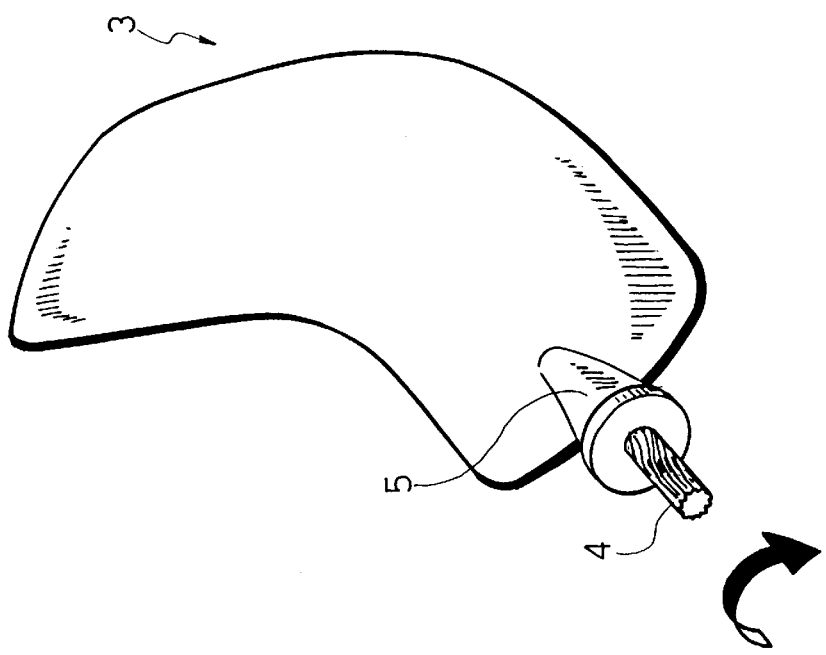
FIGS. 3, 4 are perspective views of a blade of the fan in FIGS. 1, 2 in the two aforesaid operating conditions.
Figure 3:
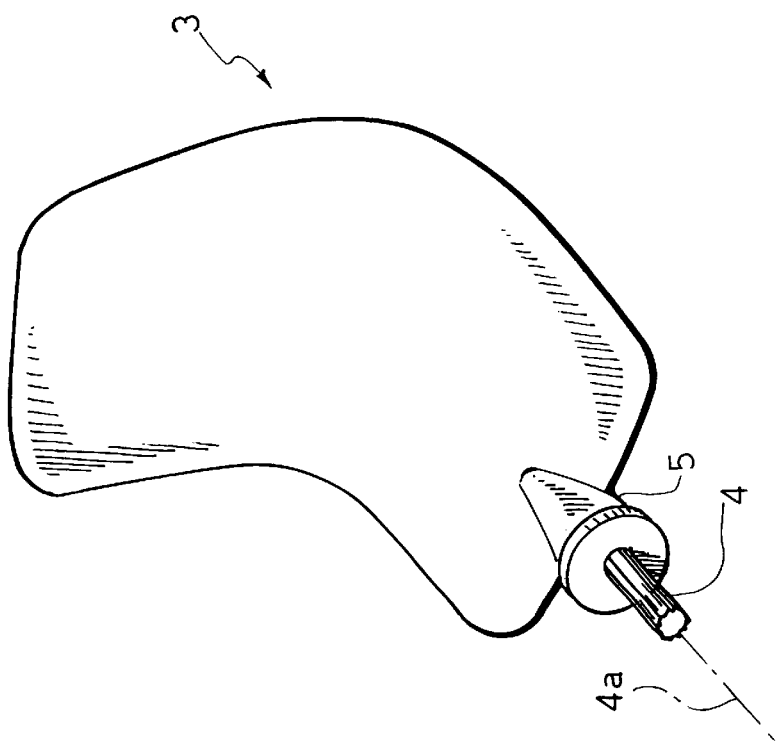

FIGS. 5, 6 relate to an alternative embodiment, in which each blade 3 is composed of a flexible element, such as in plastic material, in which shape-memory wires 6 are buried. The wires are arranged so that their contraction in the case of an increase in temperature determines a progressive twisting of the blade as the temperature increases.

Naturally, without prejudice to the principle of the finding, the constructional details and embodiments may vary widely in relation to the description and illustration provided herein purely as an example, without departing from the scope of the present invention. In particular, as already said, the afore-illustrated structure can also be utilized for a propeller. In this case the shape-memory elements are activated by controlling a passage of electric current through them.

What is claimed is:

1. Propeller or fan, comprising a hub an a plurality of blades carried by the hub, wherein each blade comprises shape-memory actuator means to regulate the direction and/or shape of the blades, each blade is composed of a flexible material and incorporates a plurality of shape-memory wires, arranged along the blade, to cause progressive twisting of the blade as the temperature increases.

2. Fan as claimed in claim 1, wherein said shape-memory actuator means can be activated automatically as the temperature vanes.

3. Fan as claimed in claim 1, wherein said shape-memory actuator means can be activated by means of supplying an electric current through them.

4. Fan as claimed in claim 1, wherein each blade of the fan is connected to the hub by a shaft composed of a shape-memory material, deformable, for example by torsion, through the action of the shaft heating, so that each blade rotates progressively from a condition in which it defines a propeller with minimum pitch to a condition of maximum pitch, as the temperature increases.

5. Cooling fan as claimed in claim 1, wherein the blades are arranged to return towards a position at rest through aerodynamic action when the temperature drops below a predetermined value.

* * * * *